United States Patent
Capone et al.

(10) Patent No.: US 10,650,158 B2
(45) Date of Patent: May 12, 2020

(54) SYSTEM AND METHOD FOR SECURE FILE ACCESS OF DERIVATIVE WORKS

(71) Applicant: Secure Circle, LLC, Los Gatos, CA (US)

(72) Inventors: Jeffrey Capone, Melon Park, CA (US); Davin Oishi, San Jose, CA (US); Artsiom Tsai, San Jose, CA (US); Joshua Jones, Livermore, CA (US); Ruslan Kazinets, San Jose, CA (US)

(73) Assignee: SecureCircle, LLC, Santa Clara, CA (US)

( * ) Notice: Subject to any disclaimer, the term of this patent is extended or adjusted under 35 U.S.C. 154(b) by 212 days.

(21) Appl. No.: 15/955,234

(22) Filed: Apr. 17, 2018

(65) Prior Publication Data

US 2019/0318107 A1    Oct. 17, 2019

(51) Int. Cl.
| | | |
|---|---|---|
| *G06F 21/00* | (2013.01) | |
| *G06F 21/62* | (2013.01) | |
| *G06F 16/13* | (2019.01) | |
| *G06F 16/14* | (2019.01) | |

(52) U.S. Cl.
CPC .......... *G06F 21/6218* (2013.01); *G06F 16/13* (2019.01); *G06F 16/152* (2019.01)

(58) Field of Classification Search
CPC .... G06F 21/604; G06F 21/6218; G06F 16/13; G06F 16/152; G06F 2221/2141
See application file for complete search history.

(56) References Cited

U.S. PATENT DOCUMENTS

| | | | | |
|---|---|---|---|---|
| 6,606,685 B2* | 8/2003 | Huxoll | .................... | G06F 16/10 |
| | | | | 711/118 |
| 8,868,626 B2 | 10/2014 | Iftode et al. | | |
| 10,404,708 B2* | 9/2019 | Capone | ................ | G06F 16/176 |
| 2006/0161966 A1* | 7/2006 | Nagampalli | ........ | G06F 21/6218 |
| | | | | 726/1 |

(Continued)

OTHER PUBLICATIONS

Rutgers University; Novel Architecture for Controlling File System Access; downloaded from http://discolab.rutgers.edu/filewall/docs/fwpatent_summary.pdf on Feb. 3, 2015—(3) pages.

(Continued)

*Primary Examiner* — Beemnet W Dada
(74) *Attorney, Agent, or Firm* — Boyle Fredrickson, SC (57) ABSTRACT

An access manager that detects a derivative work and automatically transfers digital access rights associated with an original work to the derivative work executes on a computing device. The access manager detects data to be written to a storage device and generates a new file signature for the data. The access manager compares the new file signature to existing file signatures, where the file signatures include piecewise signatures. When at least one of the piecewise signatures from the new file signature matches one of the piecewise signatures in the existing file signatures, the access manager determines that the new data to be written to the storage device is a derivative work generated from the existing file. The access rights associated with the existing file signature are copied to the new file such that the file access rights associated with the original work are passed on to the derivative work.

20 Claims, 7 Drawing Sheets

(56) References Cited

U.S. PATENT DOCUMENTS

2006/0259949 A1* 11/2006 Schaefer ............. H04L 63/0428
　　　　　　　　　　　　　　　　　　　　　　726/1
2007/0083570 A1*  4/2007 Fineberg ............. G06F 16/1873
2015/0312227 A1* 10/2015 Follis .................. H04L 63/0428
　　　　　　　　　　　　　　　　　　　　　　713/176

OTHER PUBLICATIONS

Stephen Smaldone, Aniruddha Bohra, and Liviu Iftode; Filewall: A Firewall for Network File Systems; In Proceedings of the 3rd IEEE International Symposium on Dependable, Autonomic, and Secure Computing (DASC'07), Baltimore, MD, Sep. 2007—(10) pages.

\* cited by examiner

SYSTEM AND METHOD FOR SECURE FILE ACCESS OF DERIVATIVE WORKS

BACKGROUND OF THE INVENTION

The subject matter disclosed herein relates generally to a system for secure file access and, in particular, to a system to identify and manage access to derivative works generated from original files across an enterprise whether the files are accessed internally to or externally from the physical systems of the enterprise.

Managing access to a company's electronic data presents a number of challenges for enterprises such as companies, university and other educational organizations, hospitals, local, state, and Federal government agencies and the like. The rapid expansion of bring-your-own-device (BYOD), telecommuting, and mobile computing devices, such as laptops, tablets, and smart phones, have created an environment in which an ever-increasing number of devices need to access data and often need to access data from outside an enterprise's physical location.

Historically, enterprises have purchased enterprise management software in an attempt to control access to data stored on network drives. However, existing enterprise management software is limited to controlling access to files only by computing devices connected to the network on which the enterprise management software is installed. If a file is copied to another computer, to a local drive, to a removable storage medium, or emailed to a user outside of the enterprise, the enterprise management software can no longer manage access to the file.

Another challenge for enterprise management software is to protect derivative works. A derivative work is a work that is based on or derived from an existing work. A sales presentation may, for example, be a document that is protected on a network. An initial sales presentation may be reused for multiple customers. A portion of the information may be customized to target individual customers; however, the majority of the information in the presentation may be reused between presentations. Further, a portion of the presentation may include confidential information regarding a company's future product offerings. The first sales presentation is considered the original work, and each subsequent sales presentation prepared for additional customers is considered a derivative work. The original work may be deemed to be confidential and be assigned limited access rights. It would be desirable that each derivative work automatically be assigned the same limited access rights. Absent the detection of a derivative work and automatic assignment of rights, the creator of the derivative work may not be aware of the restriction or may forget to assign the same level of access restriction to a derivative work and the content of the original work that was to be protected may be freely available in the derivative work.

Thus, it would be desirable to provide an improved file access system that can detect a derivative work and automatically transfer digital access rights associated with an original work to the derivative work.

BRIEF DESCRIPTION OF THE INVENTION

The subject matter disclosed herein describes an improved file access system that can detect a derivative work and automatically transfer digital access rights associated with an original work to the derivative work. The file access system includes an access manager executing on a computing device, where the access manager is operative to intercept system commands generated by the operating system for accessing data on a storage device in communication with the computing device. The access manager identifies a system command used to write data to the storage device and evaluates the data to be written to the storage device to determine whether the data is a derivative work. The access manager generates a new file signature for the data to be written to the storage device. The new file signature is generated by evaluating segments of the data and generating a piecewise signature for each segment. The piecewise signatures are combined to form the new file signature for the data.

After obtaining a new file signature for the data to be written to the storage device, the access manager compares the new file signature to a database containing multiple existing file signatures to determine whether the new file signature matches any of the existing file signatures. Because a derivative work includes original content from an existing file as well as new content or a modification to the original content, for example, in length, format, or the like, the access manager compares the separate piecewise signatures from the new file signature to the piecewise signatures from the existing files. If at least one of the piecewise signatures from the new file signature matches one of the piecewise signatures in the existing file signatures, the two segments of data used to generate the respective piecewise signatures match. The access manager determines, therefore, that the new data to be written to the storage device is a derivative work generated from the existing file from which the existing file signature was generated. The access rights associated with the existing file signature are copied to the file in which the new data is to be written such that the file access rights associated with the original work are passed on to the derivative work.

According to one embodiment of the invention, a system for managing access to derivative works generated on a computing device is disclosed. Each derivative work is a new file including at least a portion of another file. The system includes a data table and an access manager. The data table includes multiple first file signatures and multiple sets of file access rights. Each first file signature includes multiple piecewise signatures corresponding to data in a known file, and each set of file access rights corresponds to one of the first file signatures. The access manager is operative to receive a write instruction from an operating system on the computing device and to generate a new file signature corresponding to data to be written to a storage module in communication with the computing device in response to the write instruction, where the new file signature includes multiple piecewise signatures corresponding to the data to be written. The access manager is further operative to compare the new file signature to each of the first file signatures in the data table and, when at least one piecewise signature from the new file signature matches one of the piecewise signatures in one of the first file signatures in the data table, assign the set of file access rights corresponding to the matching first file signature to the data to be written.

According to another aspect of the invention, the access manager may generate a file container in which the data to be written and the new file signature are stored when the at least one piecewise signature from the new file signature matches one of the piecewise signatures in one of the first file signatures. The access manager may also write the new file signature and the corresponding set of file access rights to the data table.

According to still another aspect of the invention, the access manager may determine when the data table receives at least one additional first file signature and a set of file access rights corresponding to the at least one additional first file signature, generate a new file signature for at least one file stored on the storage module when the data table receives the at least one additional first file signature, and compare the new file signature for the at least one file stored on the storage module to each of the additional first file signatures. The access manager may also assign the set of file access rights corresponding to the at least one additional first file signature to the at least one file stored on the storage module when the corresponding new file signature matches the at least one additional first file signature.

According to another aspect of the invention, a method for managing access to derivative works is disclosed. A system command is intercepted with an access manager executing on a computing device, and a new file signature is generated with the access manager in response to the system command. The system command is issued from an operating system executing on the computing device, the new file signature corresponds to data to be written to a storage module in communication with the computing device, and the new file signature includes multiple piecewise signatures generated from the data to be written. A matching file signature is identified from a data table with the access manager. The data table includes multiple file signatures and multiple sets of file access rights. Each file signature in the data table includes a plurality of piecewise signatures, and each set of file access rights corresponds to one of the plurality of file signatures. The matching file signature is identified when at least one piecewise signature from the new file signature matches one of the piecewise signatures in one of the file signatures in the data table. The set of file access rights corresponding to the matching file signature is assigned to the new file signature.

According to still another embodiment of the invention, a system for managing access to derivative works on a storage module mounted in a computing device is disclosed. The storage module includes at least one file stored inside a file container and at least one file stored without a file container. The system includes a data table stored in the storage module and an access manager operative on the computing device. The data table includes multiple first file signatures and multiple sets of file access rights, where each set of file access rights corresponds to one of the first file signatures and each of the first file signatures includes multiple piecewise signatures. The access manager is configured to receive an operating system function call from an operating system executing on the computing device and to generate a new file signature corresponding to data to be written to the storage module in response to the operating system function call, where the new file signature includes a plurality of piecewise signatures corresponding to the data to be written. The access manager may also compare the new file signature to each of the plurality of first file signatures in the data table and generate a new file container when at least one piecewise signature from the new file signature matches one of the piecewise signatures in one of the first file signatures in the data table. Data to be written to the storage module and the new file signature is stored in the new file container. The set of access rights which corresponds to the first file signature with at least one piecewise signature matching at least one piecewise signature of the new file signature is assigned to the new file signature.

According to another aspect of the invention, the computing device may be in communication with a server to access a data table stored on the server. The access manager may periodically update either the data table stored in the storage module or the data table stored on the server with information from the other data table.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWING(S)

Various exemplary embodiments of the subject matter disclosed herein are illustrated in the accompanying drawings in which like reference numerals represent like parts throughout, and in which.

In describing the preferred embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

The various features and advantageous details of the subject matter disclosed herein are explained more fully with reference to the non-limiting embodiments described in detail in the following description.

Figure 1:
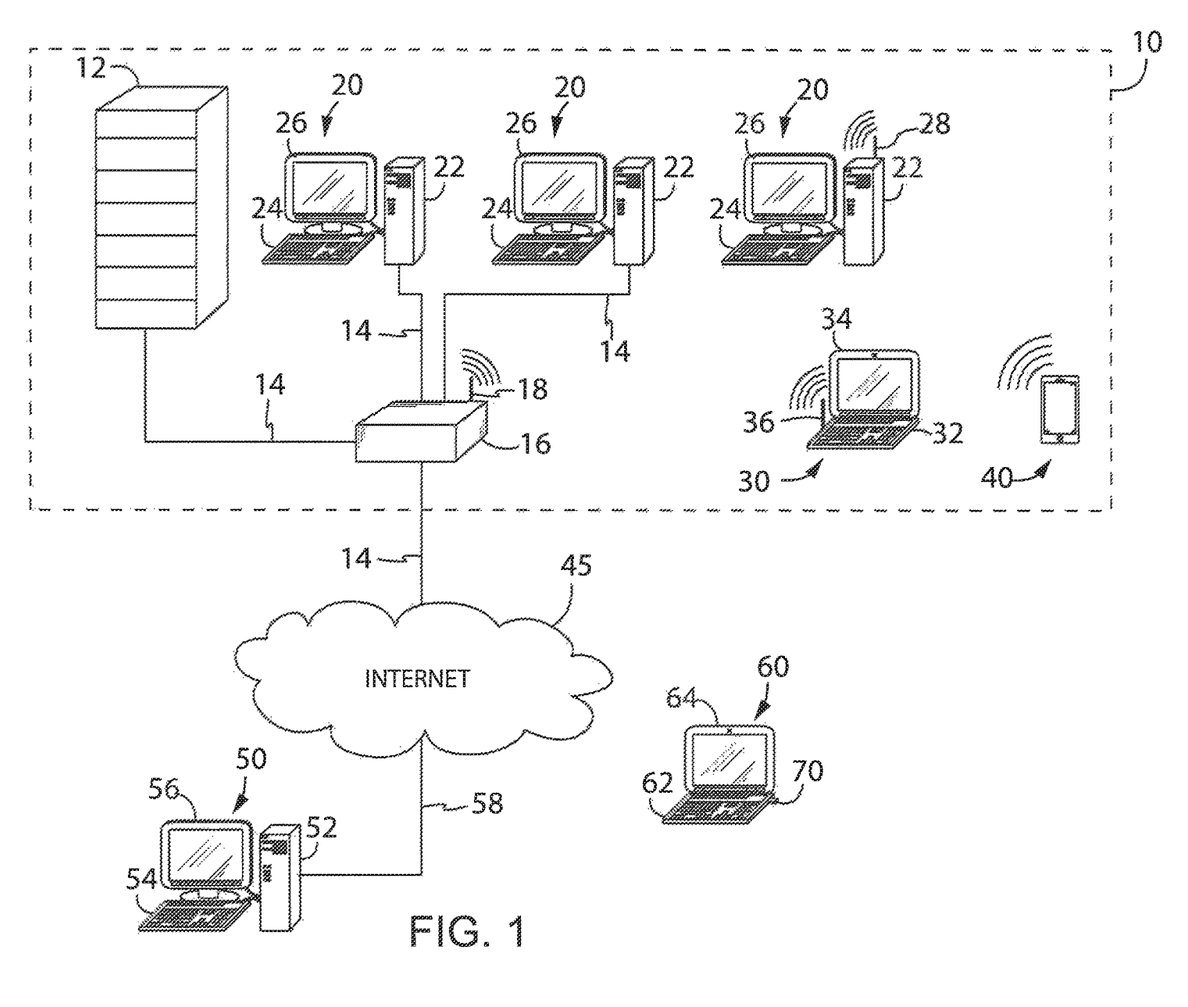
FIG. 1 is an environmental view of an exemplary enterprise incorporating one embodiment of the invention.

Referring to FIG. 1, an exemplary environment in which one embodiment of a system for secure file access is illustrated. An enterprise 10, such as a business or one location of a business, includes many different connected devices. Other examples of enterprises that may form a suitable environment for embodiments of the invention include, but are not limited to, university and other educational organizations, hospitals, local, state, and Federal government agencies. The system may be configured to provide secure file access across each of the computing devices within the enterprise 10. According to the illustrated embodiment, the enterprise 10 includes a server 12 on which data is stored. The server 12 may be a single computing device or multiple computing devices located on-site with or off-site from the computing devices 20. The multiple computing devices forming the server may include, for example, multiple, rack mounted devices, desktop devices, or a combination thereof. It is further contemplated that the multiple computing devices forming the server 12 may be located in a single location or in multiple locations throughout the enterprise 10.

A network cable 14 connects the server 12 to a network device 16. Optionally, the server 12 may be connected to the network via a wireless connection. The network device 16 may be a router, a switch, a gateway, or any other device configured to receive and retransmit messages along a network. The network device 16 may also include an antenna 18 to provide a wireless connection with one or more computing devices on the network.

One or more first computing devices 20, such as a desktop computer, may be connected to the network device 16 via a network cable 14. Optionally, one of the first computing devices 20 may be connected to the network via a wireless connection and may also include an antenna 28 for communication with the antenna 18 on the network device 16. Each of the first computing devices 20 includes a housing 22 including, for example, a motherboard on which a processor and memory are mounted. Each of the first computing devices 20 further includes one or more user interfaces, such as a keyboard 24, a touch screen, and/or a mouse, and a display 26. One or more second computing devices 20, such as a notebook or laptop computer, may also be connected to the network device 16 via a wired or wireless connection. According to the illustrated embodiment, a laptop computer 30 includes a user interface 32, such as keyboard, a touchpad, or the like, a display 34 and a data port and/or an antenna 36 to establish a wired and/or a wireless communication with the network device 16. Still other computing devices 40 may be configured to be connected to the network device 16. The other computing devices 40 include tablets, smart phones, and other Wi-Fi enabled devices that most typically include an internal antenna for wireless connection to the network device 16.

The secure file access system may also be configured to manage access to enterprise files via remote devices. Referring still to FIG. 1, a first remote computing device 50 may be connected to the enterprise 10 via the Internet 45. Both the network device 16 in the enterprise and the remote computing device 50 may have a wired connection 14, 58 to the Internet 45. Optionally, either the network device 16 or the remote computing device 50 may be wirelessly connected to the Internet 45. According to the illustrated embodiment, the remote computing device 50 includes a housing 52 including, for example, a motherboard on which a processor and memory are mounted. The remote computing device 50 further includes one or more user interfaces, such as a keyboard 54, a touchpad, and/or mouse, and a display 56. A second remote computing device 60 may be unable to connect to the enterprise 10. The second remote computing device 60 includes a user interface 62, such as keyboard, touchpad, or the like, and a display 64. A mobile data storage device 70, such as a Universal Serial Bus (USB) drive, memory card, and the like may be used to transfer files between the server 12 or a computing device 20 in the enterprise 10 and the second remote computing device 60.

Figure 2:
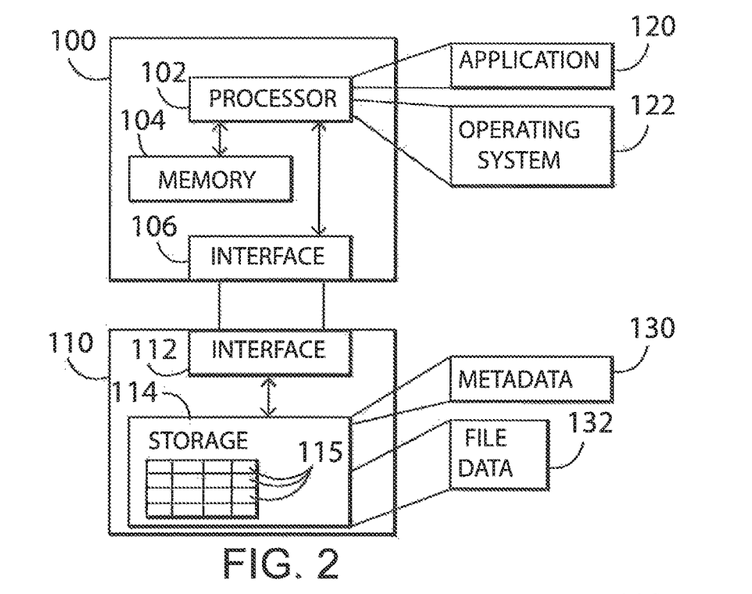
FIG. 2 is a block diagram representation of a processing unit and a storage device from FIG. 1.

Turning next to FIG. 2, a general block diagram representing the computing devices 20, 30, 40, 50, 60 of FIG. 1 is illustrated. It is understood that each computing device 20, 30, 40, 50, 60 may have various configurations and additional components to those illustrated. Further, the block diagram represents general elements of each computing device 20, 30, 40, 50, 60, and the general elements may vary between devices. According to the general block diagram, each computing device includes a processing component 100 with a processor 102 and memory 104 in communication with the processor 102. The memory 104 may include volatile memory, non-volatile memory, or a combination thereof. Each computing device further includes a physical data storage module 110. The data storage module 110 may be, for example, a hard drive, a solid-state drive, a removable memory card, and the like. A processor interface 106 and a storage interface 112 are physical layers in the processing component 100 and the data storage module 110, respectively, which establish communication between the processor 102 and the physical data storage module 110. The data storage module 110 includes block storage 114 on which data and files are saved. Each file stored in the data storage module 110 may include metadata 130 and file data 132. The metadata 130 may include, for example, pointers to particular blocks 115 in the block storage 114 at which the file data 132 is stored.

Each computing device 20, 30, 40, 50, and 60 further includes an operating system 122 to manage the resources of the computing device and to provide common services between applications 120 executing on the computing device. The operating system 122 may be stored on the data storage module 110, the memory 104 for the processing component 100, or a combination thereof. The operating system 122 may vary between computing devices and is configured to control the hardware components for the associated computing device. The processor 102 is configured to execute the operating system 122 and each of the applications 120 stored in the memory 104 or data storage module 110.

Figure 3:
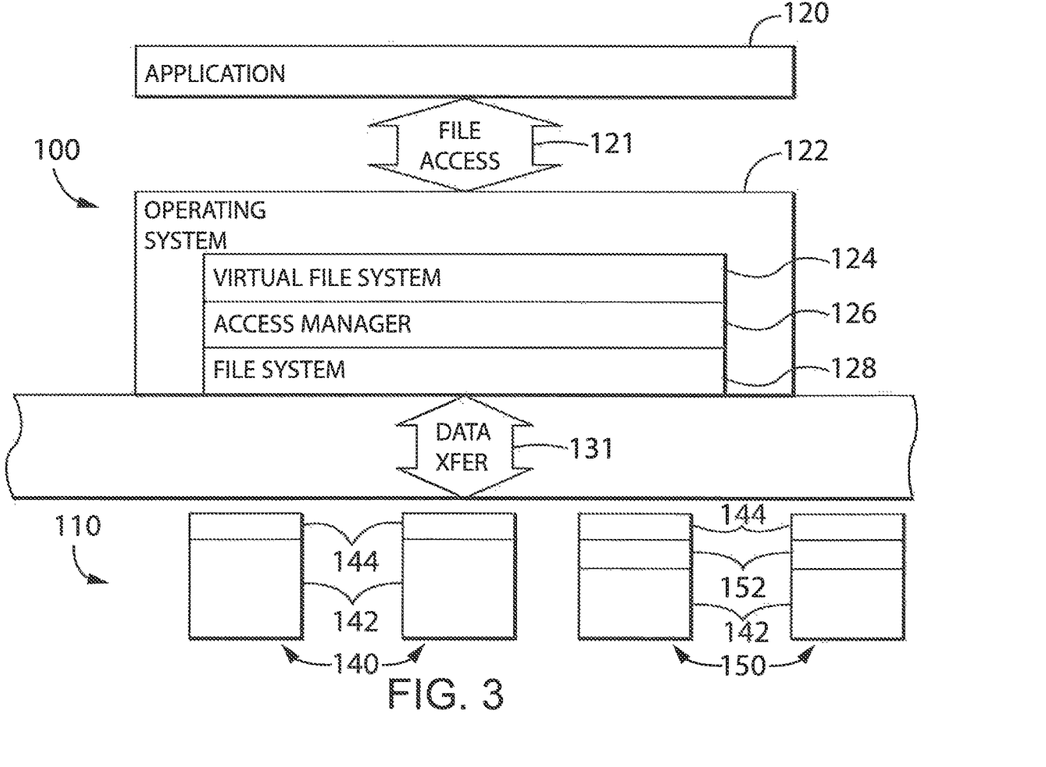
FIG. 3 is a block diagram representation of a system incorporating secure file access according to one embodiment of the present invention.

With reference next to FIG. 3, the secure file access system includes an access manager 126 loaded onto each computing device for which the system wishes to maintain secure access to the enterprise files. The access manager 126 may be a device driver, application program interface (API), or other such routine or protocol configured to be loaded onto the computing device. The access manager 126 may be stored in memory 104 for the processing component 100 or on the data storage module 110. During power-up or during initialization of the operating system 122, the operating system detects the presence of the access manager 126 on the computing device and utilizes the access manager 126 when applications 120 attempt to accesses file data 142. The data storage module 110 may contain file data 142 that both requires secure access and is accessible by any program. A standard data file 140, which is not managed by the access management system, may include file data 142 and metadata 144. Although shown as a continuous block, it is understood that the metadata 144 typically is contained in a separate location according to the operating system 122 in use on the device, and the file data 142 may be stored in nonconsecutive blocks 115 at multiple locations throughout the storage module 110. The metadata 144 for the file 140 may contain pointers to the locations at which the file data 142 is stored according to the operating system 122 requirements.

File data 142 that is managed by the access manager 126 is placed in a file container 150. The file container 150 includes the file data 142, the metadata 144, and a signature 152. It is understood that the file container 150 is a graphical representation of the data and, although shown as a continuous block, it is understood that the file container 150 may be stored in nonconsecutive blocks 115 at multiple locations throughout the storage module 110. Similar to the unmanaged file 140, the metadata 144 for the file container 150 may be contained in a separate location according to characteristics of the operating system 122 in use on the device. The signature 152 is stored at a known location with respect to the file data 142 and may be appended, for example, to the front or end of the file data 142. The metadata 144 for the file container 150 may contain pointers to the locations at which the signature 152 and the file data 142 is stored according to the operating system 122 requirements.

The file signature 152 provides a unique identifier for each file container 150. The signature 152 is a string of data that represents the file data 142 present in the container 150. The signature may be generated according to a number of different techniques and may also be referred to as a hash code or a fingerprint. The signature 152 is generated by passing the file data 142 through a routine that outputs the signature 152 and will output the same signature 152 each time identical file data 142 is passed to the routine. Similarly, it is preferred that the routine generate a unique signature for different file data 142 even when a single bit in the file data 142 changes.

In operation, the access manager 126 interfaces with a file system 128 for the operating system 122 to manage access to files 140 and file containers 150 stored on the storage module 110. An application 120 attempting to access a file 140 or file container 150, referred to herein as a calling application, is unaware of whether file data 142 being accessed is stored in an unmanaged standard file 140 or is part of a managed file container 150. The application 120, or a process, being executed requests file access 121 via operating system function calls. The operating system function calls provide a uniform interface for each application 120 on a particular computing device 20, 30, 40, 50, or 60 to access data available to that device. An exemplary file access 121 between the application 120 and the operating system 122 is a read request. The operating system 122 passes the function call to its virtual file system 124. The virtual file system 124 further allows each application 120 to issue a uniform read request when, for example, file data 142 may be stored on a network drive, having a first configuration of blocks 115, or a local drive, having a second configuration of blocks 115. The virtual file system 124 interprets the read request and converts it to the appropriate file access request for the underlying file system 128. On computing devices without the access manager 126 installed, the read request from the virtual file system 124 would be passed directly to the file system 128. When the access manager 126 is installed, the access manager 126 intercepts system commands passed between the virtual file system 124 and the file system 128. The access manager 126 is thereby able to control access to the requested file data 142.

Figure 4:
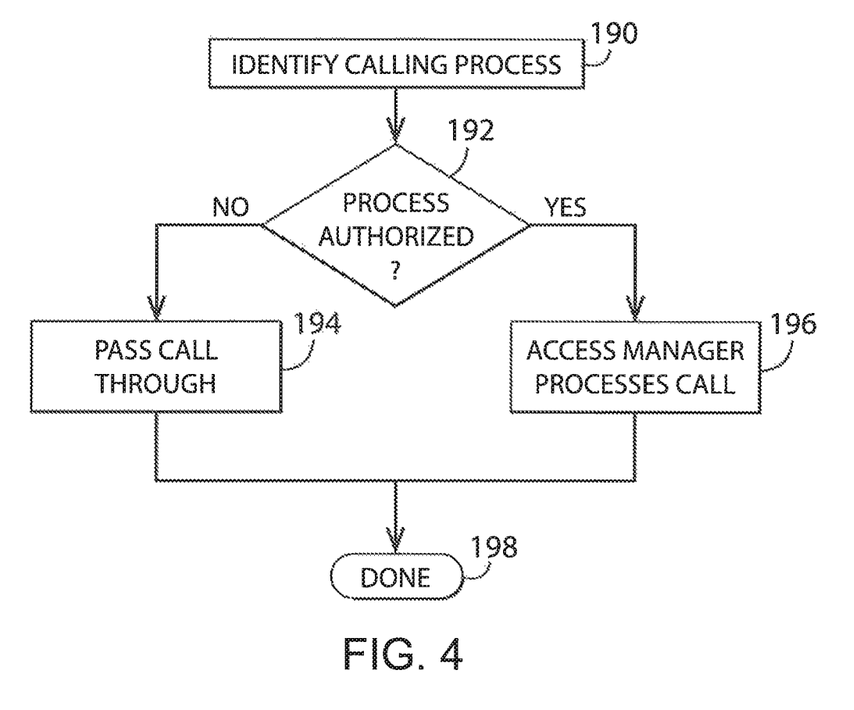
FIG. 4 is a flowchart illustrating the steps performed by the access manager to check whether a calling application is authorized to access a file container.

With primary reference next to FIG. 4 and occasional reference to FIGS. 1-3, when the access manager 126 intercepts a system command, the access manager 126 performs an initial step of determining whether the calling application is authorized to access the file data 142 within a file container 150. An authorized application list may be established in which certain applications 120 are defined as being authorized to access the contents of a file container 150. For example, a first word processing application may be authorized to access the contents of a file data 142 and a second word processing application may be denied access to the contents of the file data 142. In addition, certain applications may be permitted to move files 140 without requiring access to the file data 142. For example, a file utility may perform a file copy or a mail utility may attach a file to an electronic mail message. It certain embodiments, neither the file utility nor the mail utility is included on the authorized application list because there is no need to access the file contents of the file data 142. However, either application may still move a file 140 or file container 150 without accessing the contents of the file. These actions may be identified by the type of file access request issued by the application 120 to the operating system 122. If an unauthorized calling process is attempting to copy a file 140 or a file container 150, the entire contents of the file 140 or file container 150 will begin to be transferred as block data without extracting the file data 142 or the signature 152. Thus, unauthorized calling processes may copy or move the entire file container 150 without accessing the file data 142 within the container. The signature 152 in the file container 150 is passed intact such that future attempts to access the file data 142 must have proper authorization. Optionally, the access manager 126 may be configured to always identify whether the file to be copied is an unmanaged file 140 or a file container 150 regardless of the authorization of the application. As will be discussed in more detail below, the access manager 126 may check for the presence of a signature 152 to identify a file container 150 and further control copying or moving a file container 150 based on a set of file access rights 154 corresponding to the signature 152.

Other applications may require access to the file data 142. The file access request is typically performed by a process (referred to herein as the calling process). At step 190, the calling process is identified. At step 192, the calling process is compared to the authorized list of processes that may access the file data 142 within a file container 150. If the calling process is not authorized to access the file data 142, the access manager 126 may pass the file calls through as if it were not present, as shown in step 194. In other words, the access manager treats a file 140 and a file container 150 in the same manner for those calling processes not authorized to access file data 142 in a file container 150. The metadata 144 in either the file 140 or file container 150 may be accessed to identify at which blocks 115 within the block storage 114 the file data 142 and signature 152, if present, are stored, and the access manager 126 may begin to read the file 140 or file container 150 from the data storage module 110. Whether an unauthorized calling process was attempting, for example, to copy a file 140 or a file container 150, the calling process will be unaware that the access manager 126 intercepted the access request and execution proceeds in the same manner as if the access manager 126 were not present. Whether the calling process is attempting to access a file 140 or file container 150, it will read the file data 142 or file data 142 and signature 152 in the same manner as if the access manager were not present. If, however, the calling process is attempting to access a file container, the format of the data returned will be incorrect due to the insertion of the signature 152. To the calling process, the file container 150 will appear as a file with an improper format and the calling process will be unable to access the file data 142.

Figure 5:
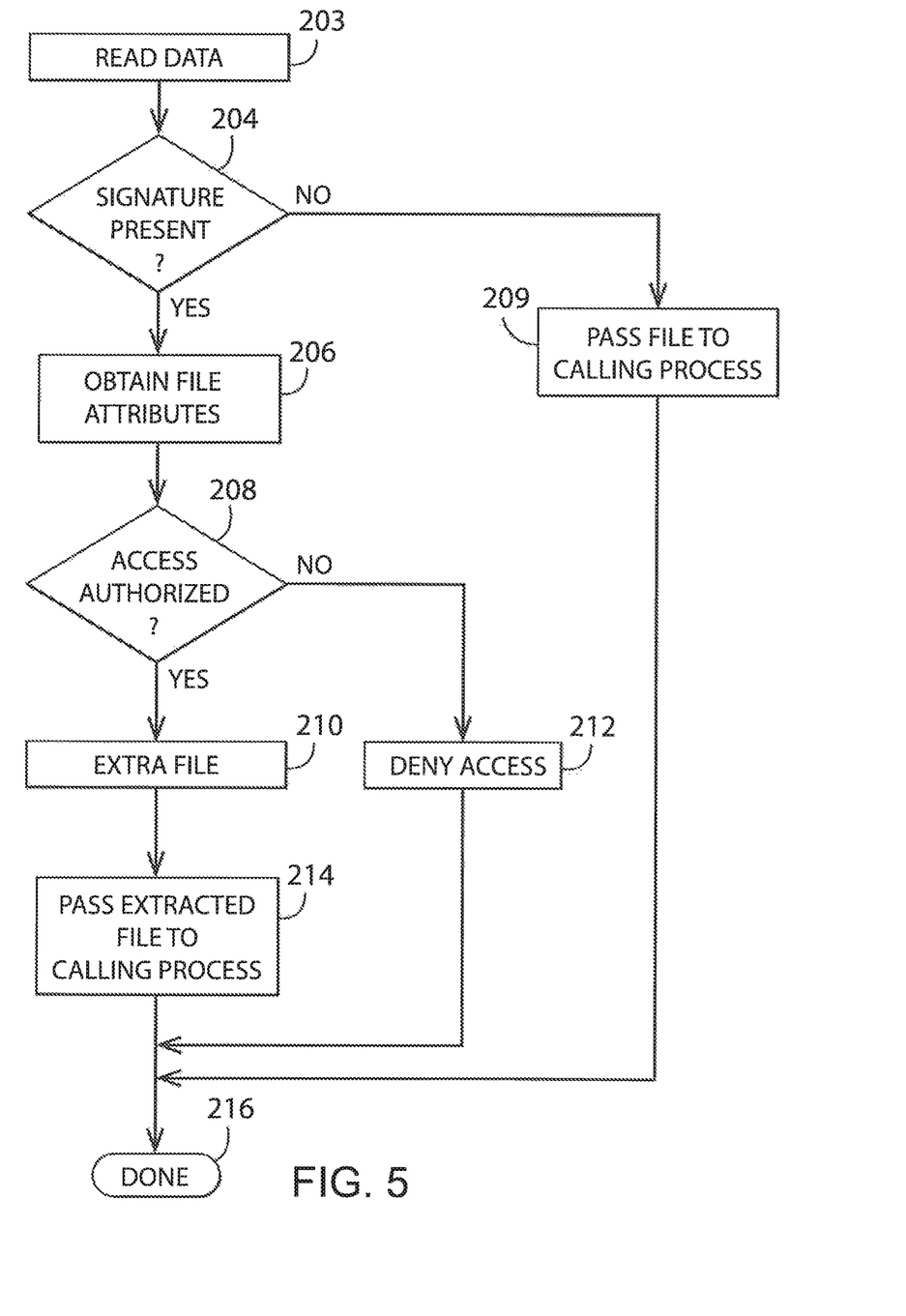
FIG. 5 is a flowchart illustrating the steps performed by the access manager when an authorized application issues a file access request to read a file.
Figure 6:
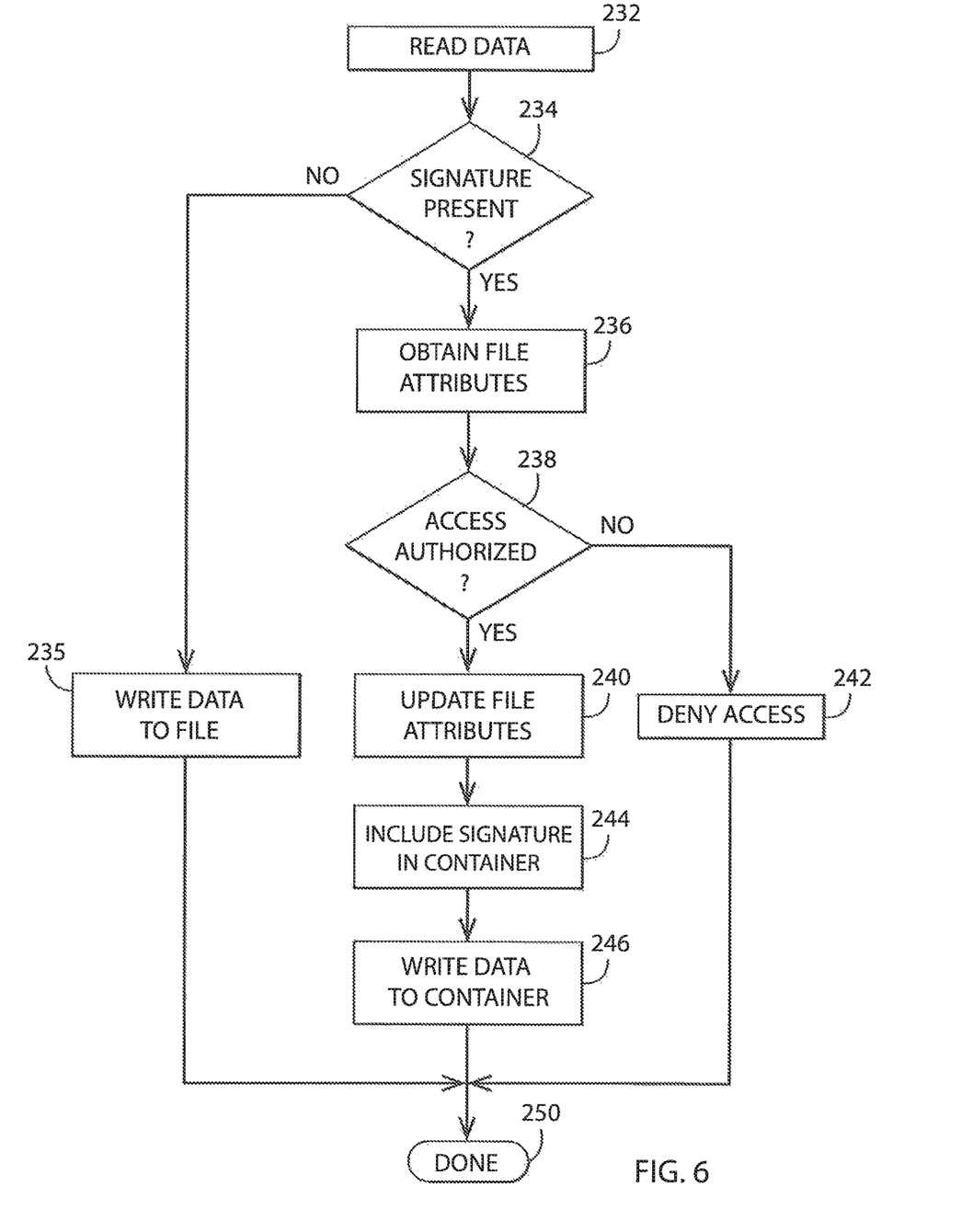
FIG. 6 is a flowchart illustrating the steps performed by the access manager when an authorized application issues a file access request to write to an existing file.

In contrast, if the calling process is on the authorized list, the access manager 126 will manage the function call, as shown in step 196. FIGS. 5 and 6 illustrate the steps performed by the access manager 126 when managing a read function call and a write function call respectively. At step 198, the access manager 126 is done responding to a function call whether it passes the call through or manages the call.

Figure 8:
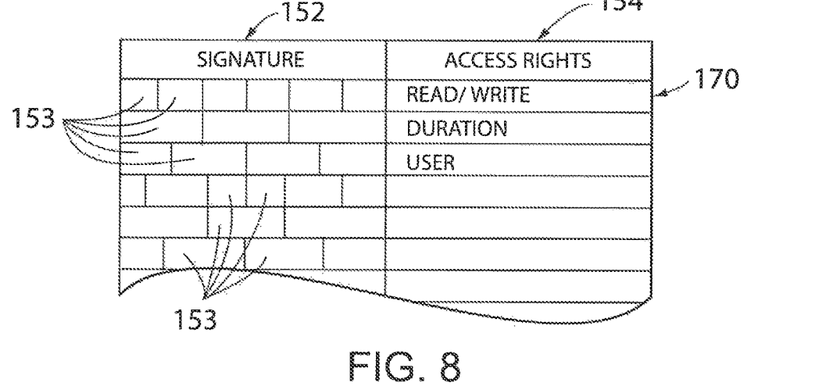
FIG. 8 is a data table including file signatures and sets of file access rights according to one embodiment of the present invention.

With reference also to FIG. 8, a permissions file 170 may be defined that includes a set of file access rights 154 associated with each file container 150. The permissions file 170 may be stored locally on the computing device 20, 30, 40, 50, or 60; may be stored remotely on the server 12; or, optionally, a local copy of the permissions file 170 may be stored on the computing device 20, 30, 40, 50, or 60 and a master copy of the permissions file 170 may be stored on the server 12 where the local copy and the master copy of the permissions file 170 are periodically reconciled to update changes to one or both of the files. The permissions file 170 may store a set of file access rights 154 for each file container 150, where each set of file access rights 154 is associated with the signature 152 from the file container 150. The set of file access rights 154 may further define additional limitations on accessing the file data 142 in a file container 150 including, for example, a limited number of reads, user restrictions, computing device restrictions, and the like. It is contemplated that the permissions file 170 and the authorized list of processes may either be separate data files or databases or combined into a single data file or database without deviating from the scope of the invention.

When the access manager 126 intercepts a system command to access a file container 150, the access manager 126 may read the signature 152 from the file container 150 and further read the set of file access rights 154 associated with the signature 152 to determine whether additional restrictions to the file data 142 exist and whether, for example, the application 120 or a user of the computing device 20, 30, 40, 50, or 60 has authorization to access the file container 150.

With primary reference next to FIG. 5 and occasional reference to FIGS. 1-3, the steps performed when file data 142 is being accessed for a "read" function are illustrated. As indicated above, an application 120 may require file access. The file access request is typically performed by a process (referred to herein as the calling process). If the calling process is authorized to access the file data 142, the access manager 126 moves to step 203 to execute the next steps in the read request. At step 203, the access manager 126 reads the data from the data storage module 110. The access manager 126 utilizes the metadata 144 for the file 140 or file container 150 to retrieve the file data 142 from the block storage 114. If the metadata is pointing to a file container 150, the access manager 126 also reads the signature 152 from the block storage 114. The file data 142 and signature 152 may be stored in non-volatile memory 104 on the processing component 100, such as a system cache, after being retrieved from the data storage module 110. At step 204, the access manager 126 checks to determine if the signature 152 is present in the data just retrieved from the data storage module 110. If no signature 152 is present, the calling process was requesting a file 140 which is not being managed by the secure file access system. The access manager 126 passes the file data 142 back to the calling process, as shown in step 209, by returning the system call to the virtual file system 124 indicating that the file data 142 has been read, and the operating system 122 returns the file data 142 to the calling application. If the file data 142 for the accessible file 140 is large or the calling application 120 needs to make repeated access to the accessible file 140, the access manager 126 passes system calls between the virtual file system 124 and the file system 128. According to one embodiment of the invention, the access manager 126 may evaluate each system call. According to another embodiment of the invention, the access manager 126 may identify a connection between the calling application 120 and the accessible file 140 and pass system calls without further evaluation until the connection has been closed.

If, however, at step 204, the access manager 126 determines that the signature 152 is present, the access manager 126 is aware that the file data 142 to be accessed is managed by the file access system. The access manager 126 then retrieves the set of file access rights 154 corresponding to the signature 152 from the permissions file 170 for the file container 150, as shown in step 206, to determine whether the calling application 120 may access the file data 142 in the file container 150. The permissions file 170 may be stored either on the local data storage module 110 or on a data storage module making up, in part, the enterprise server 12.

According to the illustrated embodiment, the file access rights 154 and corresponding signatures 152 are stored in a data file. The file access rights 154 and corresponding signatures 152 may be stored in a database, data file, or in any other suitable data repository. Creation of the file access rights 154 will be discussed in more detail below. Based on the file access rights 154, the access manager 126 determines whether the read request is authorized, as shown at step 208. If the read request is not authorized, the access manager 126 denies access to the file data 142, as shown in step 212. After denying access, the access manager 126 returns a system level message to the virtual file system 124, which, in turn, reports to the calling application 120 that access to the file data 142 was denied. Optionally, denial of access may include generating a message for display on the computing device indicating generally that the access was denied or more specifically identifying why the access was denied. The message may indicate, for example, that a maximum number of reads of the file container 150 was exceeded or a time-limited access duration has expired.

If it is determined in step 208 that the read request is authorized, the access manager 126 extracts the file data 142 from the file container 150, as shown in step 210. At step 214, the access manager 126 then passes the file data 142 extracted from the file container 150 to the calling application 120 via the virtual file system 124. The virtual file system 124 indicates that the file data 142 has been read, and the operating system 122 returns the file data 142 to the calling application 120. If the file data 142 in the file container 150 is large or the calling application 120 needs to make repeated access of the file container 150, the access manager 126 manages the repeated file access requests. After opening a file container 150, the access manager 126 may repeatedly access the file data 142 without checking the file access rights 154. Once the access manager 126 closes the file container 150, the steps illustrated in FIG. 5 must be repeated. Optionally, the access manager 126 may be configured to evaluate each system call according to the steps described above. When the file data 142 has either been retrieved from the data storage module 110 or access has been denied, the read request is complete, as shown in step 216.

As indicated above, the access manager 126 utilizes a set of stored file access rights 154 to determine whether access should be granted to file data 142 within a file container 150. When a file is created, an initial set of file access rights 154 is defined for the file. The file access rights 154 define file access permissions to the file. The file access rights 154 may be stored locally on the computing device 20, 30, 40, 50, 60 attempting to access the file container, or remotely on a server 12 within the enterprise 10.

A network administrator may initially configure a set of rules by which the file access rights 154 are generated. According to one aspect of the invention, file access rights 154 may be generated based on an access level assigned to individual users. Each user may be required to provide, for example, a username and password as identification credentials. Optionally, other identification credentials may be provided, for example, via a biometric scanner detecting the user's voice, retinal scan, or thumbprint. When each user logs on to one of the computing devices 20, 30, 40, 50, 60, access levels for each user may be retrieved identifying, for example, specific network drives and/or directories to which a user may have access. Optionally, a user may have various levels of access, such as read access only, read and write access, or permission to delete a file container 150. The level of access may vary for users based on other directories within a drive, different network drives, or even based on different computing devices by which the user is accessing the file. For example, a user may have a first level of access when attempting to access a file by a desktop computer 20 within the enterprise and a second level of access when attempting to access a file by a smart phone 40 from a remote location.

According to still another aspect of the invention, a user may be granted permission to change the attributes of a file container 150 or, optionally, the administrator may define rules that change file access rights 154 based on a user's actions. For example, if a user wishes to copy a file container 150 from a network drive connected to the server 12 to a mobile computing device 30, the user may be prompted whether there are to be any restrictions as to access of the file container 150. The user may indicate that the file container 150 may be accessed a limited number of times or for a limited duration. According to another example, if a user attached a file container 150 to an electronic mail message, the user may be similarly prompted to indicate whether there are to be any restrictions as to access of the file container 150. The user may indicate that the file container 150 may be accessed only by the recipient of the mail message or for a specified duration. In these examples, the user specified restrictions may be placed in the permissions file 170 for the copy of the file container 150 placed on the mobile computing device 30 or attached to the electronic mail message. Thus, when the copy is opened, the user specified restrictions are applied to the copy of the file container 150.

Similarly, the administrator may define rules such as limiting the number of times a file container 150 may be copied or permitting only read access to copies of file containers 150 not located on the server 12. If, for example, a user copies the file container 150 to a mobile computing device 30 or attaches a copy of a file container 150 to an electronic mail message and the administrator has set a limit of a single copy of the file container 150, the file data 142 in the file container may be accessed by an access manager 126 executing on the mobile computing device 30 or on a computing device of the recipient of the electronic mail message. However, the file access rights 154 for the copy of the file container 150 will indicate that the file container 150 on the mobile computing device 30 or attached to the electronic mail message cannot be copied again. If an attempt is made to make additional copies from the first copy, the file access rights 154 for each of those further copies will prohibit access to the file data 142. As a result, even if the file container 150 is copied beyond the number of times authorized by the administrator's rule, the file data 142 will not be accessible.

According to still another aspect of the invention, the mobile computing device 30 may include a local permissions file 170 which may be synchronized with the permissions file 170 on the file server 12. When the mobile computing device 30 is removed from the enterprise 10, the user may log in to the server 12 remotely via the internet or may operate disconnected from the server 12. If the remote user is connected to the server 12, the access manager 126 preferably accesses the permissions file 170 on the file server 12. If the remote user is not connected to the server 12, the access manager 126 may access the local permissions file 170. At periodic intervals, the mobile computing device 30 may be required to connect to the file server 12 to ensure that the local permissions file 170 is synchronized with the permissions file 170 on the server 12. Optionally, a user of the mobile computing device 30 may be authorized to change at least a portion of the local file access rights 154 in the permissions file 170 and the file access rights on the server 12 may similarly be updated when the mobile computing device 30 connects to the file server 12.

In addition to granting permission based on user credentials, the file access rights 154 may store numerous other conditions upon which permission to access a file may be granted. For example, a copy of a file attached to an email may be configured to be accessible only by the user to which the file was emailed. Optionally, the user may define a set duration for which the file is accessible after being emailed. Still other attributes may be defined, for example, the IP address of the host of the file, the MAC address of the host of the file, the number of times the file has been opened, and users of an external registration system.

In a manner similar to that described above with respect to a read request, the access manager 126 interfaces with the file system 128 for the operating system 122 to manage access to files 140 and file containers 150 stored on the storage module 110 when a write request is issued from a calling application 120. The calling application 120 is unaware of whether file data 142 is being stored in a readily accessible file 140 or is part of a managed container 150. The application 120 requests file access 121 via operating system function calls. The operating system 122 passes the function call to its virtual file system 124. The virtual file system 124 interprets the write request and converts it to the appropriate file access request for the underlying file system 128. On computing devices without an access manager 126 installed, the write request from the virtual file system 124 would be passed directly to the file system 128. When the access manager 126 is installed, the access manager 126 intercepts system commands passed between the virtual file system 124 and the file system 128. The access manager 126 is thereby able to control access to the requested file data 142.

Referring next to FIG. 6, the steps performed when a request is issued to access an existing file container 150 in order to overwrite a portion or all of the file data 142 in the existing file container are illustrated. As discussed above with respect to FIG. 4, the access manager 126 first determines when the calling application is authorized to access file data 142. If the calling process is authorized to access the file data 142, the access manager 126 moves to step 232 to execute the steps in the write request.

The access manager 126 receives the write request from the calling application and must first determine whether the file data 142 is to be written to an unmanaged file 140 or a file container 150. Therefore, the access manager 126 reads the file data 142 and the signature 152, if present, of the file 140 or file container 150 from the data storage module 110, as shown in step 232. The file data 142 and signature 152 may be stored in non-volatile memory 104 on the processing component 100, such as a system cache, after being retrieved from the data storage module 110. At step 234, the access manager 126 checks if the signature 152 is present in the data just retrieved from the data storage module 110. If no signature 152 is present, the access manager 126 passes the system call to the file system 128 to allow the file system 128 to write the new file data 142 to the unmanaged file 140, as shown in step 235. If the new file data 142 to be written to the file 140 is large or the calling application 120 needs to make repeated access of the file 140, the access manager 126 passes system calls between the virtual file system 124 and the file system 128. According to one embodiment of the invention, the access manager 126 may evaluate each system call. According to another embodiment of the invention, the access manager 126 may identify a connection between the calling application 120 and the accessible file 140 and pass system calls without further evaluation until the connection has been closed.

If, however, at step 234, the access manager 126 determines that the signature 152 is present, the access manager 126 is aware that the file container 150 to which the application 120 is attempting to write is managed by the file access system. The access manager 126 then retrieves the set of access rights 154 corresponding to the signature 152 for the file container 150, as shown in step 236, to determine whether the calling application 120 may modify the file data 142 in the file container 150. As previously discussed, the file access rights 154 may be stored either on the local data storage module 110 or on a data storage module making up, in part, the enterprise server 12. Based on the file access rights 154, the access manager 126 determines whether the write request is authorized, as shown at step 238. If the write request is not authorized, the access manager 126 denies access to the file container 150, as shown in step 242. After denying access, the access manager 126 returns a system level message to the virtual file system 124, which, in turn, reports to the calling application 120 that access to the file data 142 was denied. Optionally, denial of access may include generating a message for display on the computing device indicating generally that the access was denied or more specifically identifying why the access was denied. For example, the file container 150 may be designated as read-only or may require a higher user access level in order to be overwritten.

However, if it is determined in step 238 that the write request is authorized, the access manager 126 updates file access rights 154, if required, as shown in step 240. For example, if a copy of a file container 150 is being edited on a remote computing device 50, connected to the internet 45, the access manager 126 may update the file access rights 154 on the server 12 indicating a newer revision to the copy stored on the server 12 exists. The file access rights 154 for access to the copy on the server 12 may be changed to read only until the original file and the edited copy are synchronized. At step 244, the access manager 126 verifies that the signature 152 for the file data being modified is present, rewrites the signature into the file container 150, or, optionally, generates a new file signature 152 based on the new file data 142 being written. The permissions file 170 may be updated with the new signature 152 if necessary. In this manner, if a user attempts to copy a file, for example, by editing the file data and saving it to a new location, the signature 152 is copied, or updated, along with the file data 142. Without the signature 152, the file container 150 is essentially an unmanaged file 140. Therefore, ensuring that the signature 152 is present and/or rewritten when either a portion or all of the file data 142 is written back to the storage module 110 ensures that the file data 142 being modified remains under control of the access management system. At step 246, the file data 142 to be modified is then inserted into the file container 150. As indicated above, the file data is initially read from the data storage module 110 into cache to check for the signature. Inserting new data into the file data 142 commonly occurs in cache for rapid file access. The signature 152 and the file data 142 are then transferred, or written, to the data storage module 110. If the file data 142 in the file container 150 is large or the calling application 120 needs to make repeated access of the file container 150, the access manager 126 manages the repeated file access requests. After opening a file container 150, the access manager 126 may repeatedly write the file data 142 without checking the file access rights 154. Once the access manager 126 closes the file container 150, the steps illustrated in FIG. 6 must be repeated. Optionally, the access manager 126 may be configured to evaluate each system call according to the steps described above. When the file data 142 has either been written to the data storage module 110 or access has been denied, the write request is complete, as shown in step 250.

The secure file access system allows a network administrator to secure file data 142 both within and outside of an enterprise 10. The network administrator establishes rules by which file access rights 154 are assigned. The rules may define, for example, who has access to a file, the level of access (e.g., read, write, or copy), a duration of access, and the like. The file access rights 154 are stored in a permissions file 170 accessible by computing devices 20, 30, 40, 50, 60 connected to the enterprise 10. The computing devices 20, 30, 40, 50, 60 may be connected either from within or external to the enterprise 10. Optionally, a remote computing device 60 unable to connect to the enterprise 10 may have at least a portion of the permission file 170 loaded into a local copy on the remote computing device to permit access to file data 142 when the remote computing device 60 is not connected to the enterprise 10.

To secure file data 142 within unmanaged files 140, the secure file access system assigns a signature 152 to each file 140, and the signature 152 and file data 142 are packaged within a file container 150. To the operating system 122, each file container 150 appears the same as an unmanaged file 140. For example, an unmanaged file 140 and a file container 150 containing the same file data 142 may both be saved in a directory on a drive with the same file extension. However, due to the signature 152 and packaging of the signature 152 and file data 142 into the file container 150, an application 120 attempting to access the file container 150 without the access manager 126 would detect an error in the file. For example, if a word processing application attempted to open a document in the unmanaged file 140, the document would display in the word processing application. However, if the word processing application attempted to open the file container 150 directly without the access manager 126, the file would appear corrupted or of the wrong format, and the word processing application would be unable to open the file container 150.

The access manager 126 allows applications executing on the local device to access file containers 150. The access manager 126 intercepts file access requests at the operating system level and identifies whether a file is an unmanaged file 140 or a file container 150. If a file being accessed is an unmanaged file 140, the access manager 126 passes system calls between the virtual file system 124 and the file system 128. If, however, the file being accessed is a file container 150, the access manager 126 reads the signature 152 from the file container 150, checks the file access rights 154 to verify that the file container 150 may be accessed by a current user, at the particular computing device, at the particular time, or as defined by any other file attribute or attributes. If the access manager 126 determines that the file container 150 may be accessed, it unpackages the file data 142 from the file container 150 and passes the file data 142 to the calling application 120. By loading the access manager 126 on each computing device 20, 30, 40, 50, 60 which needs to access the file data 142 and by providing access to a central permissions file 170, the secure file access system provides an improved method of managing access to files.

In addition to managing versions of file containers 150, the access manager 126 may further be configured to identify and manage access to derivative files 160 generated from the original file containers. As previously indicated, a derivative file 160 is a file that is based on or derived from an existing file. In other words, at least a portion of the data 142 from the original file is present in the derivative file. A derivative file may be generated by an application 120, such as a word processing application, spreadsheet application, or the like, copying a portion of the data present in an existing file to a new file. A derivative file may similarly be generated by an application converting an initial file from one format to another. After copying the portion of the data from the existing file, the application 120 may add to the data, modify the data, or simply save the copied portion of the data to a new file 144. During the save process, the application 120 writes the copied portion of the data to a storage module 110 in communication with the processing component 100 on which the application is executing. However, rather than writing data to an existing file 140 or existing file container 150, the application creates a new file in which the data is stored.

Figure 7:
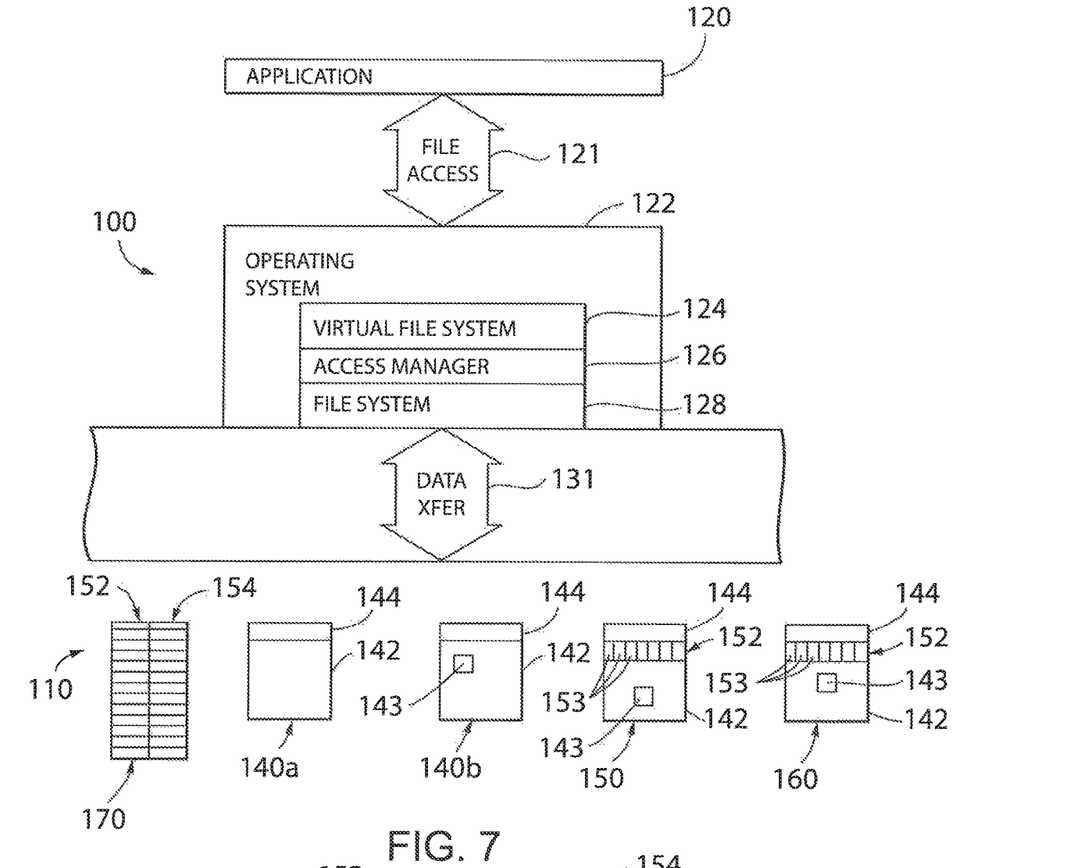
FIG. 7 is a block diagram representation of a system identifying derivative works according to one embodiment of the present invention.

With reference, for example, to FIG. 7, it is contemplated that a derivative file 160 may be generated either from an existing file 140b or an existing file container 150 present on the storage module 110. A portion 143 of the file data 142 taken from either the existing file 140b or the existing file container 150 is included in the file data 142 for the new, derivative file 160. When the application 120 that is being used to create the derivative file 160 attempts to save the file data 142 for the derivative file 160, it invokes a system command from the operating system 122 to write the data to the storage module 110. Similar to the file access discussed above, an application 120 attempting to write file data 142 to the storage module 110, referred to herein as the writing application, is unaware of whether file data 142 to be written should be stored in an unmanaged standard file 140 or as part of a managed file container 150. The writing application 120, or process, being executed initiates the data write by requesting file access 121 to create a new file on the storage module 110 via operating system function calls. The operating system function calls provide a uniform interface for each application 120 on a particular computing device 20, 30, 40, 50, or 60 to access the storage module 110. The operating system 122 passes the function call to its virtual file system 124, which, in turn, allows each application 120 to issue a uniform write request when, for example, file data 142 may be stored on a network drive, having a first configuration of blocks 115, or a local drive, having a second configuration of blocks 115. The virtual file system 124 interprets the write request and converts it to the appropriate file access request for the underlying file system 128. The access manager 126 intercepts the write request passed between the virtual file system 124 and the file system 128 and uses the write request to determine whether the file data 142 to be written, or a portion 143 thereof, belongs to an existing file container 150 which may include restrictions on the use of the file data 142 within the file container 150.

Figure 9:
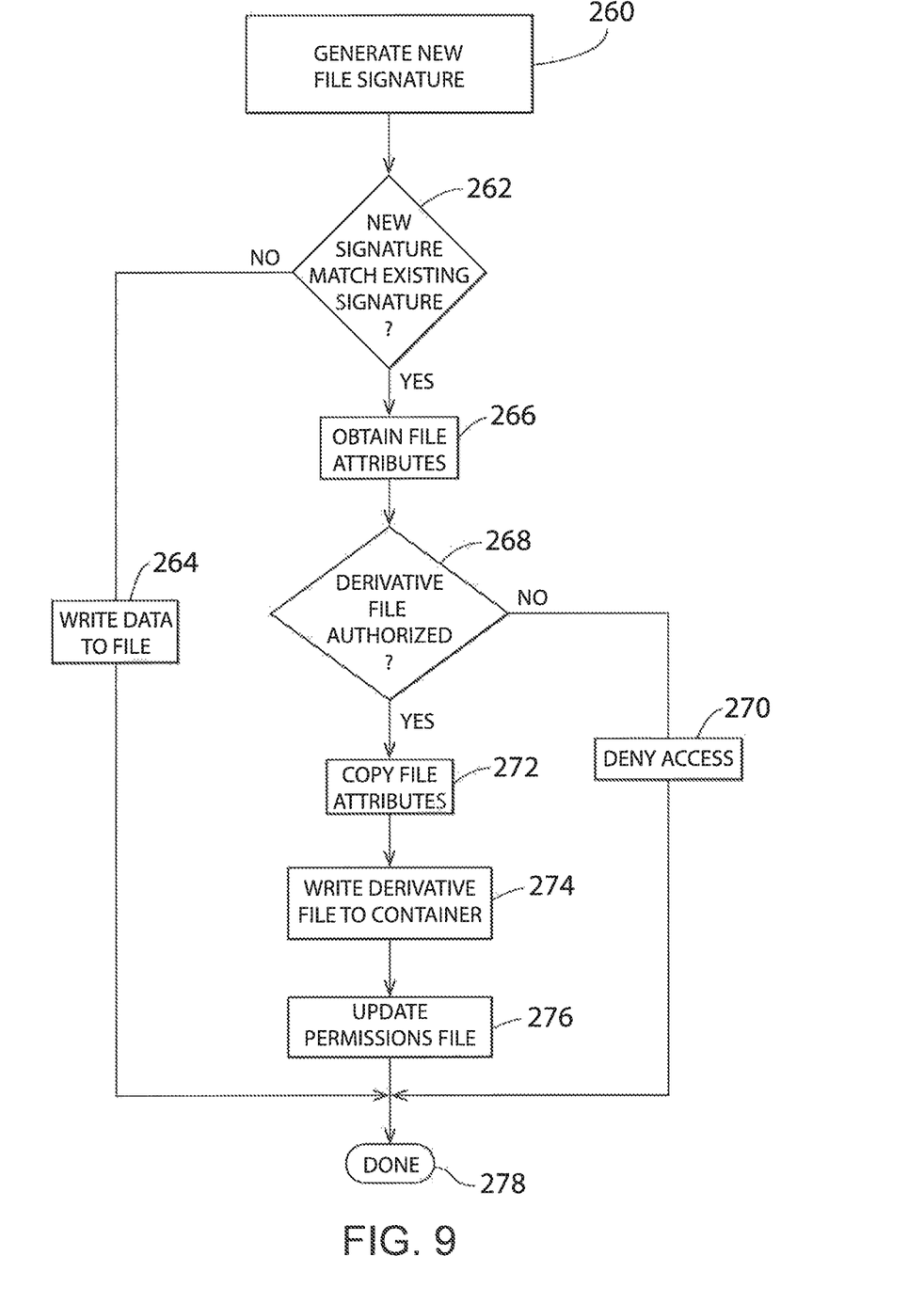
FIG. 9 is a flowchart illustrating the steps performed by the access manager to identify and protect a derivative file when an application writes to a new file.

Referring next to FIG. 9, the steps performed when a write request is issued to generate a new file 140 or new file container 150 in order to save new file data 142 are illustrated. The access manager 126 must first determine whether a portion 143 of the file data 142 belongs to an existing file container 150 and, if so, whether any restrictions exist in the original file container 150 that should be carried over to the new file container for the derivate work 160.

As shown in step 260, the access manager 126 first generates a new file signature 152 for the data to be written to the storage module 110. As illustrated in FIG. 7, the new file signature 152 includes multiple piecewise signatures 153. Rather than generating a single signature for all of the file data 142 to be included in the new file, the file data 142 is divided into segments and a piecewise signature 153 is generated for each segment. The piecewise signatures 153 are, in turn, combined and stored as a single signature 152.

According to one embodiment of the invention, the file data 142 to be written is divided into discrete binary segments and a piecewise signature 153 is generated for each segment. The data is divided into binary segments having sufficient length such that identical segments include enough data to such that it would be desirable to protect the copied data in the same manner as the original data. At the same time, the data is divided into binary segments having a short enough length such that identical segments are likely to be detected. It is contemplated, therefore, that the file data 142 to be stored is divided into segments having at least one hundred twenty-eight (128) or two hundred fifty-six (256) bytes and, preferably, the segments have at least five hundred twelve (512) bytes of data. A piecewise signature 153 or fingerprint is generated for each segment using, for example, a hash function, and the piecewise signatures 153 of each segment are concatenated into the single signature 152.

According to another embodiment of the invention, the file data 142 is divided into overlapping segments on a rolling basis. When generating the piecewise signatures on a rolling basis, a two-step process may be utilized. An initial portion of the file data 142 is selected to generate an intermediate signature. For each subsequent intermediate signature, a portion of the data is replaced. For example, the initial segment of the file data 142 may be the first five hundred twelve bytes of data. An initial intermediate signature is generated from the initial segment. Subsequent segments of the file data may add one or two bytes of data to the end of the segment while dropping a corresponding one or two bytes of data at the start of the segment. The resulting segment is of the same length as and overlaps a portion of the initial segment but defines a different segment of the file data. A new intermediate signature is generated for each subsequent segment, where each intermediate signature is generated for each segment using, for example, a hash function. The intermediate signature is then compared to a predefined value. When the intermediate signature equals the predefined value, this signature corresponds to an anchor point within the file data 142. At this anchor point, a second signature is obtained. The second signature is a piecewise signature 153 and may be generated by the same or by a different method as the intermediate signature. It is contemplated that the intermediate signatures may utilize a shorter number of data bytes than the second, piecewise signatures to generate the signature. Each of the piecewise signatures 153 are concatenated into the single signature 152. It is contemplated that still other methods or combinations of methods may be utilized to generate the piecewise signatures 153 without deviating from the scope of the invention. Regardless of the method of generating piecewise signatures selected, the same method is utilized to generate the piecewise signatures 153 for the signatures 152 stored in the permissions file 170 and to generate the piecewise signatures 153 of the new file signature, such that the access manager 126 may utilize the piecewise signatures 153 of the new file signature to detect a derivate work.

Having generated a new signature 152 for the data to be written to the storage module 110, the access manager 126 next determines whether the new signature generated matches one of the signatures 152 present in the permissions file 170, as shown in step 262. If the new signature does not match an existing signature 152, the access manager 126 determines that the file data 142 to be written is not a derivative work of one of the file containers 150 and writes the data to a new file, as shown in step 264. The access manager 126 may be configured to prompt a user to define a new set of access rights 154 for the new file data if desired. If no limits are to be imposed on the new data, the file data 142 may be written as a standard file 140 to the storage module 110. If the user wishes to assign access rights 154 to the new file data 142, the new signature and the file data 142 are written to a new file container 150 and the permissions file 170 is updated to include the new file signature 152 and the new access rights 154 associated with the new file signature 152. If the new file data 142 to be written to the file 140 or file container 150 is large, the access manager 126 may pass multiple system calls between the virtual file system 124 and the file system 128. According to one embodiment of the invention, the access manager 126 may evaluate each system call. According to another embodiment of the invention, the access manager 126 may establish a connection between the calling application 120 and the new file 140 or file container 150 and pass system calls without further evaluation until the connection has been closed.

Because the access manager 126 is detecting a derivative work, only a portion 143 of the data in the new file will match the data in the original file. In order to identify whether a portion 143 of the data in the derivative file 160 matches data in a file container 150, the access manager 126 compares individual piecewise signatures 153 from the new signature to the piecewise signatures 153 in existing file signatures 152. If one of the piecewise signatures 153 in the new file signature matches a piecewise signature 153 from an existing file signature 152, the two portions 143 of file data 142 used to generate each piecewise signature 153 are identical. The access manager 126 then identifies the new file to be generated as a derivative file 160 from the file container 150 corresponding to the signature 152 in which the matching piecewise signature 153 was identified.

When the new file data to be written is identified as a derivative work, the access manager 126 determines whether a derivative file 160 is permitted and, if so, ensures that any access rights 154 associated with the original file container 150 are carried over to the derivative file 160. As shown in step 266, the access manager 126 reads the set of access rights 154 that corresponds to the matching signature 152 from the original file container 150. The access manager 126 determines whether the file data 142 from the original file container 150 is permitted to be copied to a new file based on the set of access rights 154 as shown in step 268. The access rights 154 may, for example, limit the file data 142 as read only or restrict copying to certain users. The access manager 126 may further compare the user data against the access rights 154 to determine whether the present user is authorized to copy the data. If the access rights 154 either prohibit or restrict the file data 142 in the original file container from being copied, the access manager 126 prevents the write command from writing the new file data to the storage module 110, as shown in step 270. After preventing the derivative work from being generated, the access manager 126 returns a system level message to the virtual file system 124, which, in turn, reports to the calling application 120 that permission to write the file data 142 was denied. Optionally, denial of access may include generating a message for display on the computing device indicating generally that the access was denied or more specifically identifying why the access was denied. For example, the file container 150 may be designated as read-only or may require a higher user access level in order to generate a derivative file 160.

If, however, at step 268, the access manager 126 determines that generation of the derivative file is permitted, the access manager moves to step 272 and copies the set of access rights 154 corresponding to the signature 152 of the original file container 150, as stored in the permissions file 170. The access manager 126 writes the new file data 142 and the new file signature 152 to the derivative file 160 as shown in step 274. The access manager also updates the permissions file 170, as shown in step 276, to include the new file signature 152 as well as the original set of access rights 154. As a result, the access rights 154 associated with the original file container 150 are migrated to the derivative file 160 and prevent subsequent unauthorized access of the portion 143 of the original file container that was copied. Without the signature 152 and the file access rights 154, the file container 150 is essentially an unmanaged file 140. Therefore, ensuring that the signature 152 is present and/or rewritten when even a portion 143 of the file data 142 is written back to the storage module 110 ensures that the file data 142 being modified remains under control of the access management system.

It is also contemplated that the access manager 126 may modify the set of access rights 154 associated with the derivative file 160. For example, the access manager may make the derivative file 160 read only until the server 12 has been updated with the new file signature and the new access rights. The rules associated with a derivative file may be defined individually for different file containers 150 and stored in the corresponding set of file access rights 154 or may be implemented as a general policy by a system administrator and be universally applied by the access manager 126.

If the file data 142 to be written to the derivative file 160 is large or the calling application 120 needs to make repeated access of the derivative file 160, the access manager 126 manages the repeated file access requests. After opening the derivative file 160, the access manager 126 may repeatedly write the file data 142 without checking the file access rights 154. When the file data 142 has either been written to the data storage module 110 or access has been denied, the write request for a derivative file is complete, as shown in step 278.

According to another aspect of the invention, the access manager 126 may be used to retroactively assign access rights 154 to a file. As indicated above, a local computing device may include a local permissions file 170. The enterprise 10 may also include a master permissions file 170 stored, for example, on a server 12. The master permissions file 170 may be updated by multiple users, an administrator, or a combination thereof accessing data on the server 12. As a result, the access rights 154 to a particular file container 150 may be changed on the server 12 and may need to similarly be changed on the local copy of the permissions file 170 so that data in a local copy of the file container 150 is managed accordingly. Optionally, an administrator may decide that a particular unmanaged file 140 is to become a managed file and may assign a set of access rights to the file data 142. The access manager 126 executing on the administrator's computing device generates a new file signature 152, packages the file data 142 and new file signature 152 into a new file container 150 and stores the new file container 150 on the server 12 or on the administrator's computing device. However, it may then be necessary to identify all copies or derivative files corresponding to the newly created file container 150 such that the file data 142 that the administrator wishes to control access to is properly managed.

In order to reconcile a local copy of the permissions file 170 with a master copy or to retroactively assign access rights 154 to file data, the permissions file 170 may be periodically updated. The access manager 126 or another configuration application may be configured to write new file signatures 152 and the corresponding set of file access rights to the permissions file 170. The access manager 126 or configuration application may further be able to initiate a scan of a storage module 110 connected to the processing component 100 or, optionally, the access manager 126 may periodically scan the permissions file 170 to identify a new file signature stored therein. When the access manager 126 determines that one or more additional file signatures 152 and the associated set of file access rights 154 have been added to the permissions file 170, the access manager 126 can begin scanning storage modules 110 in communication with the computing device 100 to identify unmanaged files 140 present on the storage module 110. The access manager 126 generates a new file signature for each unmanaged file 140 and compares the new file signature to the additional file signatures 152 added to the permissions file 170. If a piecewise signature 153 from the new file signature matches a piecewise signature 153 from one of the additional file signatures, the access manager 126 identifies the unmanaged file as being either identical to or at least a derivative file of the original file from which the additional file signature 152 was generated. The access manager 126 generates a file container 150 in which the file data 142 from the unmanaged file 140 and the new file signature 152 are stored. In addition, the access manager 126 updates the permissions file 170 with the new file signature, generated based on the unmanaged file 140, and the set of access rights 154 associated with the additional file signature 152. In this manner, the access manager 126 may retroactively identify a copy or a derivative work of a file which has a file signature 152 added to the permissions file 170 after copies have already been made.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A system for managing access to derivative works generated on a computing device, wherein each derivative work is a new file including at least a portion of another file, the system comprising:
   a data table including a plurality of first file signatures and a plurality of sets of file access rights, wherein each first file signature includes a plurality of piecewise signatures corresponding to data in one of a plurality of known files and wherein each set of file access rights corresponds to one of the first file signatures; and
   an access manager operative to:
      receive a write instruction from an operating system on the computing device;
      generate a new file signature corresponding to data to be written to a storage module in communication with the computing device in response to the write instruction, wherein the new file signature includes a plurality of piecewise signatures corresponding to the data to be written,
      compare the new file signature to each of the plurality of first file signatures in the data table, and
      when at least one piecewise signature from the new file signature matches one of the plurality of piecewise signatures in one of the plurality of first file signatures in the data table, assign the set of file access rights corresponding to the matching first file signature to the data to be written.

2. The system of claim 1 wherein the access manager is further operative to generate a file container in which the data to be written and the new file signature are stored when the at least one piecewise signature from the new file signature matches one of the plurality of piecewise signatures in one of the plurality of first file signatures.

3. The system of claim 1 wherein the access manager is further operative to write the new file signature and the corresponding set of file access rights to the data table.

4. The system of claim 1 wherein the access manager is further operative to:
   determine when the data table receives at least one additional first file signature and a set of file access rights corresponding to the at least one additional first file signature,
   generate a new file signature for at least one file stored on the storage module when the data table receives the at least one additional first file signature, and
   compare the new file signature for the at least one file stored on the storage module to each of the additional first file signatures.

5. The system of claim 4 wherein the access manager is further operative to assign the set of file access rights corresponding to the at least one additional first file signature to the at least one file stored on the storage module when the corresponding new file signature matches the at least one additional first file signature.

6. The system of claim 1 wherein the computing device is in communication with a server to access the data table stored on the server.

7. The system of claim 1 wherein the data table is stored on a storage module in the computing device.

8. A method for managing access to derivative works, the method comprising the steps of:
- intercepting a system command with an access manager executing on a computing device, wherein the system command is issued from an operating system executing on the computing device;
- generating a new file signature with the access manager in response to the system command, wherein the new file signature corresponds to data to be written to a storage module in communication with the computing device and wherein the new file signature includes a plurality of piecewise signatures generated from the data to be written;
- identifying a matching file signature from a data table with the access manager, wherein:
  - the data table includes a plurality of file signatures and a plurality of sets of file access rights,
  - each file signature in the data table includes a plurality of piecewise signatures,
  - each set of file access rights corresponds to one of the plurality of file signatures, and
  - the matching file signature is identified when at least one piecewise signature from the new file signature matches one of the plurality of piecewise signatures in one of the file signatures in the data table; and
- assigning the set of file access rights corresponding to the matching file signature to the new file signature.

9. The method of claim 8 further comprising the steps of:
- generating a new file container in which the data to be written and the new file signature are stored when the matching file signature is identified; and
- storing the new file container on the storage module.

10. The method of claim 8 wherein the access manager is further operative to write the new file signature and the corresponding set of file access rights to the data table.

11. The method of claim 8 further comprising the steps of
- determining when the data table receives at least one additional first file signature and a set of file access rights corresponding to each additional first file signature,
- generating a new file signature with the access manager for at least one file stored on the storage module when the data table receives the at least one additional first file signature, and
- comparing the new file signature for each file stored on the storage module to each of the additional first file signatures.

12. The method of claim 11 further comprising the step of assigning the set of file access rights corresponding to the at least one additional first file signature to the file stored on the storage module when the corresponding new file signature matches the at least one additional first file signature.

13. The method of claim 8 further comprising the step of establishing a connection between the computing device and a server wherein the data table is stored on the server.

14. The method of claim 8 wherein the data table is stored on the storage module in the computing device.

15. A system for managing access to derivative works on a storage module mounted in a computing device, wherein the storage module includes at least one file stored inside a file container and at least one file stored without a file container, the system comprising:
- a data table stored in the storage module, wherein the data table includes:
  - a plurality of first file signatures, and
  - a plurality of sets of file access rights, wherein each set of file access rights corresponds to one of the plurality of first file signatures and wherein each of the plurality of first file signatures includes a plurality of piecewise signatures; and
- an access manager operative on the computing device, wherein the access manager is configured to:
  - receive an operating system function call from an operating system executing on the computing device,
  - generate a new file signature corresponding to data to be written to the storage module in response to the operating system function call, wherein the new file signature includes a plurality of piecewise signatures corresponding to the data to be written,
  - compare the new file signature to each of the plurality of first file signatures in the data table,
  - generate a new file container when at least one piecewise signature from the new file signature matches one of the plurality of piecewise signatures in one of the plurality of first file signatures in the data table,
  - store the data to be written and the new file signature to the storage module in the new file container, and
  - assign the set of file access rights, which corresponds to the first file signature with at least one piecewise signature matching at least one piecewise signature of the new file signature, to the new file signature.

16. The system of claim 15 wherein the access manager is further operative to write the new file signature and the set of file access rights assigned to the new file signature to the data table.

17. The system of claim 15 wherein the access manager is further operative to:
- determine when the data table receives at least one additional first file signature and a set of file access rights corresponding to each additional first file signature,
- generate a new file signature for at least one file stored on the storage module when the data table receives the at least one additional first file signature, and
- compare the new file signature for each file stored on the storage module to each of the additional first file signatures.

18. The system of claim 17 wherein the access manager is further operative to:
- generate a new file container when at least one piecewise signature from the new file signature for the file stored on the storage module matches one of the plurality of piecewise signatures in one of the additional first file signatures,
- move data in the file to the new file container, and
- assign the set of file access rights, which corresponds to the additional first file signature with at least one piecewise signature matching at least one piecewise signature of the new file signature for the file stored on the storage module, to the new file container.

19. The system of claim 15 wherein the computing device is in communication with a server to access a data table stored on the server.

20. The system of claim 19 wherein the access manager is operative to periodically update at least one of the data table stored in the storage module and the data table stored on the server with information from the other data table.

* * * * *